Patented Nov. 5, 1940

2,220,573

UNITED STATES PATENT OFFICE 2,220,573

METHOD FOR PREPARING THICKENERS FOR PRINTING TEXTILE FABRICS

Fred G. La Piana, Forest Hills, Long Island, N. Y., and Dave E. Truax, Providence, R. I., assignors to Stein, Hall & Company, Inc., New York, N. Y., a corporation of New York No Drawing. Application January 7, 1939,
Serial No. 249,730

5 Claims. (Cl. 8—70)

This invention relates to compositions for printing fabrics and processes for preparing the same, and particularly relates to the preparation of textile printing compositions of the type including starch thickeners.

Compositions containing starch thickeners that are used in printing textiles have heretofore been prepared by cooking starch until a colloidal dispersion or solution of the starch is obtained, after which dyes and their associated chemicals are added to the cooked starch paste. The starch is usually cooked from 1 to 5 hours in steam-jacketed kettles or directly with live steam, at temperatures between 160° F. and 212° F., until the starch is converted into the colloidal solution. The solution or thickener must then be cooled to about room temperature, either before or after the dyes and other chemicals are added before it is ready for use.

This method of preparing thickeners has a number of disadvantages in commercial operation. Special equipment, such as steam-jacketed kettles, a steam generator or steam supply, a cold water supply, and mixers are required for cooking and cooling the thickener, all of which involve considerable expense in the initial cost as well as in operation. Accordingly, small textile printing plants cannot afford to install the necessary equipment and must purchase prepared thickeners. The cost of such prepared thickeners is excessive for the reason that it includes manufacturer's profits and transportation costs. Even when the volume of textile printing justifies the expense of installing starch cooking equipment, preparation of cooked starch thickeners is disadvantageous for the reason that the time required to cook the thickeners and then to cool them is such as to make their preparation expensive and also necessitate their preparation considerably in advance of their use. Accordingly, when textile printing operations are intermittent or variable, preparation of the thickeners in quantities in advance of use may result in the waste of large amounts of thickener. Furthermore, if the cooked thickeners are allowed to stand for an appreciable time after preparation they increase in viscosity and are difficult to use in printing operations. If the thickener is not prepared in advance, a delay in the printing of many hours is encountered by cooking and cooling the thickener before it can be used. Such thickeners cannot be used for printing fabrics without cooling, for the reason that they may damage the fabric being printed.

We have discovered that starch thickeners for textile printing can be prepared by the treatment of starch with a small amount of caustic without heat, that the thickeners may be used with success for all types of dyes in textile printing operations, and that the thickeners are considerably more uniform in viscosity over extended periods of time than the thickeners prepared by boiling starch. In addition, we have discovered that in instances where a neutral thickener or less alkaline thickener is desired, or even when an acid thickener is necessary, that the caustic can be converted into a salt that is a desirable or necessary adjunct to the dye used in the thickener.

Accordingly, an object of the present invention is to overcome the disadvantages characterizing the preparation of fabric printing compositions with boiled starch thickeners by utilizing starch thickeners that may be quickly prepared just prior to the printing operation, and at a minimum of expense.

Another object of the invention is to provide a method of preparing textile printing compositions in which the thickeners therefor may be prepared without heating or cooling.

Another object of the invention is to provide compositions for printing fabrics that contain starch thickeners prepared by treatment of starch or starch products with small amounts of caustic.

A further object of the invention is to prepare a thickener without heat which can be employed with all types of dyes and is compatible with the various chemicals, acids and alkalies associated with different types of dyes to effect the dyeing of the fabrics at the printed areas.

An additional object of the invention is to provide starch thickeners which have substantially uniform viscosity over extended periods of time.

The invention consists generally of preparing thickeners by treatment of starch or starch-containing materials at ordinary temperatures with small amounts of caustic and if desired, thereafter neutralizing, acidifying or otherwise modifying the thickener for cooperation with various types of dyes. The caustic thickener may be treated chemically in order to convert the caustic into salts which are essential to the production of fast colors in the fabric. The thickener may be prepared with a minimum of equipment so that small printing establishments can easily practice the invention and printing compositions can be prepared in about 15 minutes as compared with 1 to 5 hours in the case of boiled thickeners.

In accordance with the invention, thickeners may be prepared by treating starch, starch gum, tapioca flour, British gums or mixtures of the same, (hereinafter referred to generally as amylaceous material) in admixture with cold water or water at normal temperatures with caustic. Enough caustic, such as caustic soda, caustic potash or other alkali metal hydroxide, is added to cause the starch material to swell and form a substantially clear dispersion. The amount of caustic required to disperse the starch and/or gum may vary with the nature of the starch, the degree of solubility desired, the concentration and temperature of the dispersion, within the approximate limits of from 3 to 8% caustic by weight of starch and/or starch conversion product. The resulting thickener may be used directly with the dye or may be modified to take on the particular characteristics required for cooperation with the dye. Likewise, various chemicals can be added to the thickener prior to, during or after its conversion by caustic.

By way of example, the following printing compositions are given merely as illustrative and without any limitation on the scope of the invention as described heretofore.

Example I 50 grams of British gum and 80 grams of starch, or 130 grams of special high viscosity starch gum, are mixed in cold water and 9 grams of caustic soda is added. The mixture is stirred until a substantially clear dispersion or colloidal solution is obtained. If the thickener is to be used with a vat dyestuff, sodium or potassium bicarbonate is added to the dispersion in sufficient quantity to react with the caustic and provide a part of the carbonate content that is an essential part of the vat dye printing composition. If the amount of carbonate so formed is not sufficient additional soda ash (sodium carbonate) may be added for solubilizing the dyestuff; hydrosulphite and formaldehyde, as reducing agents, and glycerine for softening the color, also are added with the bicarbonate. The following proportions are illustrative:

| | Grams |
|---|---|
| Bicarbonate of soda | 19 |
| Soda ash | 75 |
| Hydrosulphite and formaldehyde | 105 |
| Glycerine | 75 |

Sufficient water is added to produce one liter of the paste to which the vat dyestuff is added.

The usual prior art formula is a heat cooked thickening containing a starch, a British gum of high solubility or, in their place, a British gum of medium or low solubility, sodium or potassium carbonate, hydrosulphite, formaldehyde and glycerine, in approximately the following proportions:

| | Grams |
|---|---|
| Corn starch | 80 |
| British gum | 50 |
| Soda ash | 105 |
| Hydrosulphite-formaldehyde | 105 |
| Glycerine | 75 |

Water to make 1000 grams.

As contrasted with the novel method described above, the usual method of preparing the prior art composition consists in adding the starch and British gum to the cold water, and bringing the temperature to 160° F.–180° F. Sodium carbonate (soda ash) may be added at this point, although some of the carbonate may be added at the start. The temperature is then raised as near to the boiling point, 212° F. as possible, and kept there for at least an hour—and then the paste is cooled to about 140° F.–130° F. when the hyposulphite, formaldehyde and glycerine are added. The batch is left in the kettle, stirring and cooling until the temperature drops to 70° F.–75° F. before the paste is withdrawn from the cooking apparatus.

It will be seen, therefore, that in accordance with the invention, the relative proportions of the ingredients of the composition may be substantially the same as in the prior art, so that the composition has similar dyeing properties; but the necessity for heating and cooling the composition is eliminated in accordance with the process of the invention, and in addition a printing composition is obtained which has a more uniform viscosity.

Example II

A printing composition containing solubilized vat dyes, such as Indigosols and Algosols usually includes, besides a thickener, neutral sodium chromate and ammonia. A thickened composition containing such dyes and chemicals can be prepared in accordance with the invention with the following chemical constituents:

| | | |
|---|---|---|
| Starch or starch gum | grams | 95 |
| Caustic soda | do | 5 |
| Bichromate of soda | do | 18 |
| 25% ammonia | c. c. | 10 |

Water to make 750 c. c.

The starch or starch gum is mixed with cold water, the caustic soda added, and the mixture stirred until a clear dispersion of the starch is obtained. The thickener can be prepared in about 15 minutes and without heating and cooling as in the usual methods. To this is added the bichromate of soda which is converted by the caustic into the required neutral sodium chromate.

When Indigosols are printed with Aniline Black the ammonia need not be added. Likewise, with certain of these colors, ammonium chloride or ammonium sulphocyanide may be added. A liter of printing composition can be prepared by adding to 750 c. c. of the thickener, 250 c. c. of standard dyestuff solution prepared by dissolving 1 lb. of dye in a gallon of solvent.

Printing compositions containing salt colors (diazo dyes) are prepared conventionally by cooking starch, mixing the cooked starch with cooked gum tragacanth or locust bean gum, and adding sodium acetate and acetic acid with the proper diazo solution. In accordance with the invention, a diazo dye composition can be prepared by treating starch in cold water with caustic soda after which the caustic soda is neutralized with acetic acid to form a part of the required sodium acetate. The locust bean or gum tragacanth paste can then be added. Diazo color and additional acetic acid and sodium acetate may be added to provide the acidity and acetate concentration required by these colors.

Thickeners made in accordance with the invention can be used with other types of dyes and may be modified further, depending upon the dye with which they are to be used. For example, the Rapidogens or Pharmasols are strongly alkaline and require caustic soda to place the dyestuff in solution before compounding it with the thickening. In preparing a thickener in accordance with the invention for use with such dyes, caustic soda may be used to disperse starch or gum, and thereafter the caustic soda may be at least partially neutralized with a mineral or organic acid or acid salt to form a stable neutral salt which will not act as a buffer salt for formic and acetic acids which are used in aging the print. If the caustic is not neutralized, the solution will not age properly or require more acid for aging, and the color will be too alkaline to print properly. Preferably, the excess caustic is neutralized with sulphuric or hydrochloric acid to produce neutral salts.

In preparing printing compositions containing Aniline Black, caustic potash should be used for solubilizing the starch and it may thereafter be completely neutralized with chloric acid to produce chlorate of potash, which is a necessary ingredient in most Aniline Black formulas.

With mineral colors sodium acetate is a necessary ingredient, and as a consequence caustic soda should be used in preparing thickeners and thereafter neutralized with acetic acid.

Some dyes, such as sulfur colors, require strong alkaline thickenings and in this case the caustic need not be neutralized or converted into a salt.

Printing compositions embodying the invention have a viscosity that renders them most suitable for printing operations, and due to the higher degree of dispersion of the starch, are more soluble and may be removed more readily from the fabric after the color has been set.

It will be seen, therefore, that the caustic thickeners used in the process of the invention and which are present in the printing compositions not only are entirely satisfactory from the physical standpoint, but by suitable treatment with added chemicals, can be caused to react and form salts that are required to obtain proper action of the various dyestuffs that may be mixed therewith. This fact, when taken with the great simplicity of preparation and the elimination of expensive equipment, renders the process of the invention extremely advantageous.

It is known that starch or starch conversion products can be converted into colloidal solutions by treatment with alkalies such as caustic soda or potash. But there has been no appreciation that such a solution is suitable and has the desired physical and chemical properties to be utilized as a thickener in textile printing with dyes and other necessary chemicals.

It is also known that caustic solutions, rendered strongly alkaline by the addition of large proportions of caustic, have been used heretofore in conjunction with indigo for dyeing fabrics, because indigo is insoluble, except when converted into its leuco or soluble form by reduction with glucose, zinc hydrosulfite or other hydro compound in a strongly alkaline solution. In such caustic solutions, starch is sometimes added. The use of such a large quantity of alkali, considerably in excess of that which is employed in accordance with the invention, is essential to and is used only for the production of a soluble dye that can be applied to textiles. In such procedures there has been no appreciation that any solubilization of starch by alkali is advantageous in producing a thickener suitable for use in a printing operation.

It will be understood that the process and product are susceptible to considerable modification without departing from the invention. Therefore, the above described embodiments of the invention should be considered as illustrative only and not as limiting the scope of the following claims.

We claim:

1. A method of preparing fabric dye printing compositions comprising a thickener, a dye, and a salt auxiliary to the dye fixing operation, which comprises preparing a thickener by treating an ungelatinized amylaceous material with caustic in a dilute solution at ordinary temperatures to convert the amylaceous material into a thickened and colloidal form, said caustic being less than 8% by weight of the amylaceous material, adding a dye to the thickener and an acidic material such as to convert at least a part of said caustic to the salt auxiliary to the dye fixing operation.

2. A method of preparing fabric dye printing compositions comprising a thickener, a vat dye, an alkaline salt and a reducing agent, which comprises preparing a thickener by treating an ungelatinized amylaceous material in an aqueous solution at ordinary temperatures with caustic in an amount less than 8% by weight of the amylaceous material to convert the same into a thickened and colloidal form, and adding to the thickener a vat dye, a reducing agent, and an acid material to convert said caustic into an alkaline salt.

3. A method of preparing fabric dye printing compositions comprising a thickener, a vat dye, a soluble carbonate, and a reducing agent, which comprises preparing a thickener by treating an ungelatinized amylaceous material in an aqueous solution at ordinary temperatures with caustic in an amount less than 8% by weight of the amylaceous material to convert the same into a thickened and colloidal form, and adding to the thickener a vat dye, a reducing agent, and a soluble bicarbonate to convert said caustic into a soluble carbonate.

4. A method of preparing fabric dye printing compositions comprising a thickener, a solubilized vat dye, and a chromate, which comprises preparing a thickener by treating an ungelatinized amylaceous material in an aqueous solution at ordinary temperatures with caustic in an amount less than 8% by weight of the amylaceous material to convert the same into a thickened and colloidal form, and adding a solubilized vat dye to the thickener and a bichromate for converting said caustic into chromate.

5. A method of preparing fabric dye printing compositions comprising a thickener, a diazo dyestuff, and an alkali metal acetate, which comprises preparing a thickener by treating an ungelatinized amylaceous material in an aqueous solution at ordinary temperatures with caustic in an amount less than 8% by weight of the amylaceous material to convert the same into a thickened and colloidal form, and adding a diazo dyestuff to the thickener and acetic acid for converting said caustic into an acetate.

FRED G. LA PIANA.
DAVE E. TRUAX.